Sept. 2, 1930.  J. W. HENRY  1,774,648
BLOCK MOLDING MACHINE
Filed July 25, 1928  2 Sheets-Sheet 1
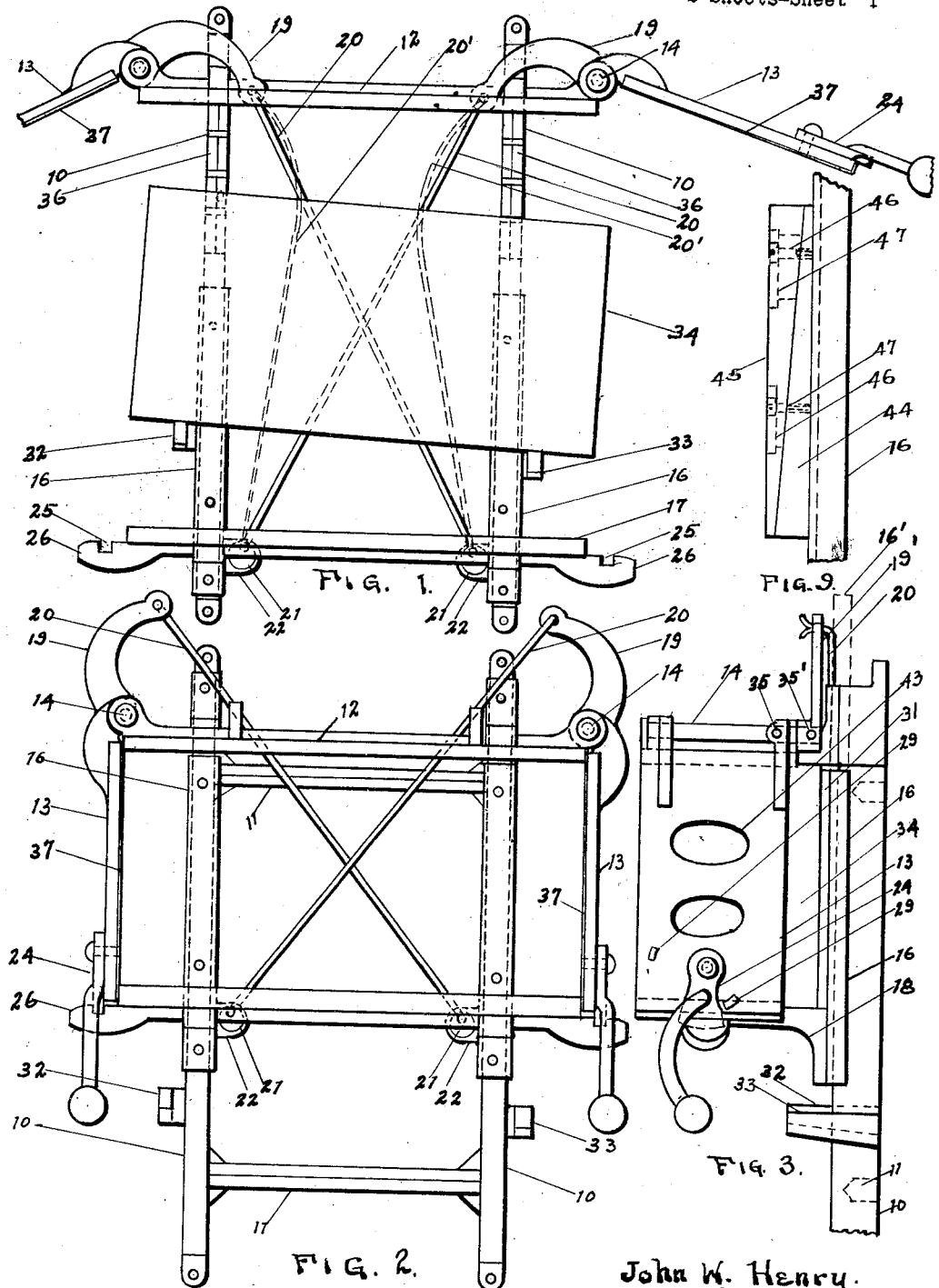
John W. Henry, Inventor
T. A. Sperry, Attorney.

Sept. 2, 1930.  J. W. HENRY  1,774,648
BLOCK MOLDING MACHINE
Filed July 25, 1928   2 Sheets-Sheet 2
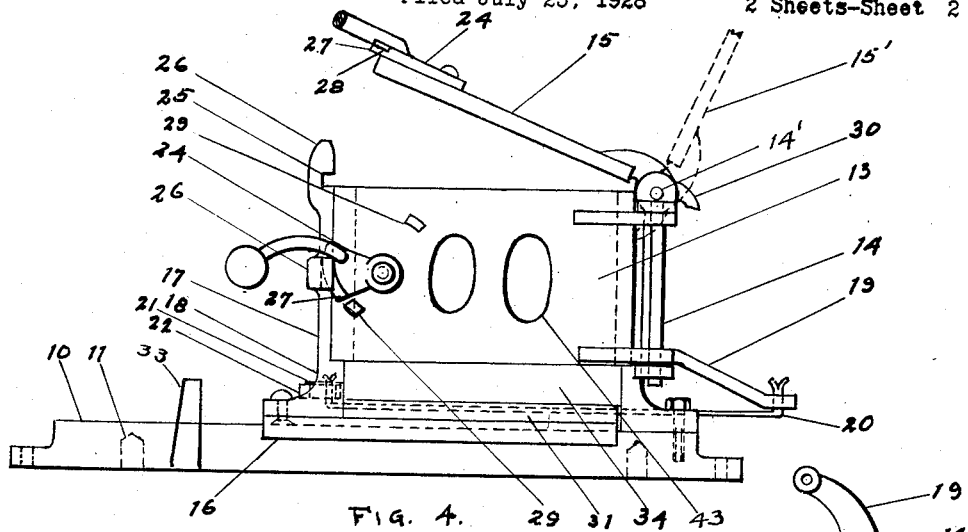
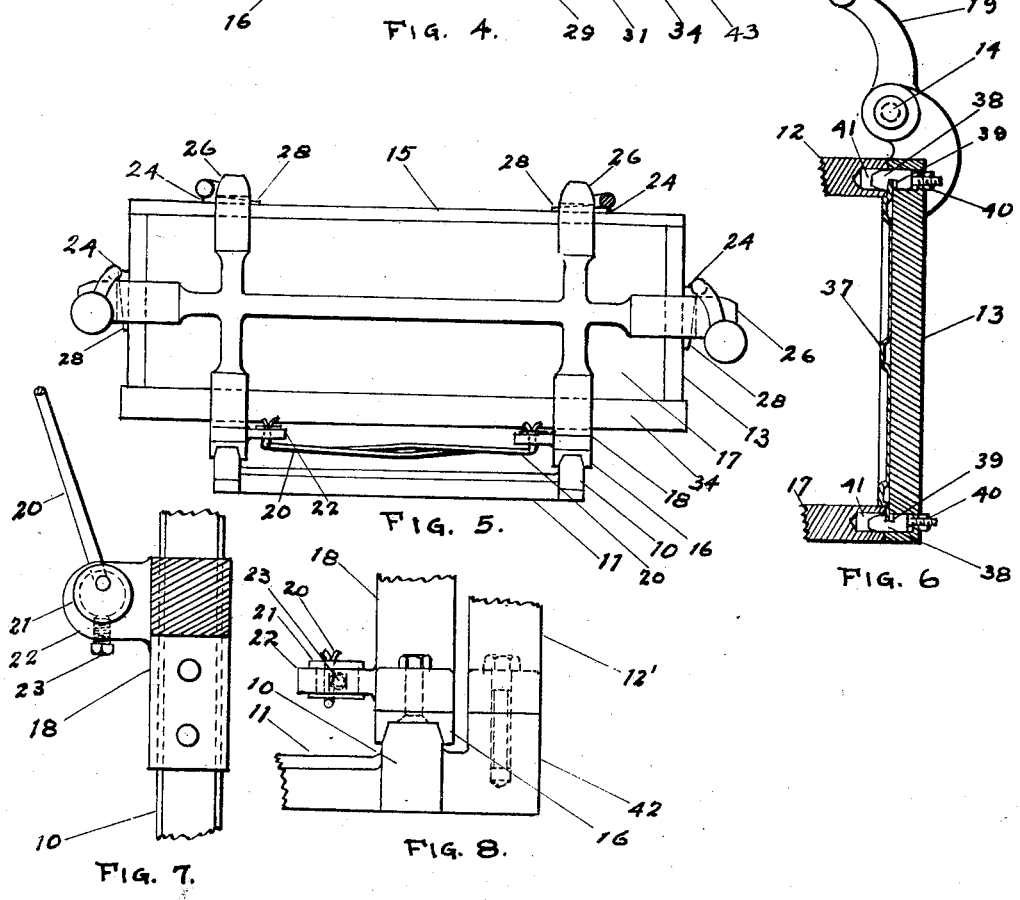
John W. Henry.
Inventor.
J. A. Sperry
Attorney.

Patented Sept. 2, 1930

1,774,648

UNITED STATES PATENT OFFICE

JOHN W. HENRY, OF CRAWFORDSVILLE, INDIANA

BLOCK-MOLDING MACHINE

Application filed July 25, 1928. Serial No. 295,128.

My invention relates to block molding machines in general, and more specifically to molds which may be opened hingedly for removal of the blocks therefrom, and has for its especial objects the following provisions,—a mold in which the front plate remains constantly parallel to the back plate of the mold; a mold in which the front plate travels in parallel relation to the back plate; a mold in which the front plate moves laterally with the arcuate opening of the end plates; a mold in which the end plates move free from the molded block before the block is moved from the back plate; a mold in which the finished block is moved forward with the front mold plate and then is stripped arcuately from the front plate as said plate moves from the back plate; a mold in which the side, end and cover plates are accurately located in position by double faced cam latches when the mold is closed; a mold having interchangeable face forming plates removably secured to the permanent wall plates of the mold; and a mold in which the formed block may be of any desired size, shape or configuration with a minimum of adjustment of the mechanism itself.

With these and other related objects in mind, my invention will be more readily comprehended by reference to the accompanying drawings illustrating preferred forms of the arrangement, in which like numerals refer to like parts throughout, and in which Figure 1 is a top plan view of the device in open or expanded position, Figure 2 being a similar view of the device in closed position, the cover plate and pallet being removed, while Figure 3 is an end elevation of one form of the construction. Figure 4 is an end elevation of a slightly modified form, Figure 5 being a front elevation, while Figure 6 is a fragmentary plan view in section of a portion of one end of the mold. Figure 7 is a detail plan of a front plate support and its rod adjustment, and Figure 8 is a fragmentary elevation of a modified form of the side plate supports. Figure 9 is a detail elevation of a pallet adjusting strip.

With further consideration of the drawings, the numeral 10 indicates the plural side rails and 11 is the cross ties constituting the base or frame of the machine. On the rear ends of the rails 10 is rigidly mounted the back plate 12 of the mold, to which is pivotally attached the end plates 13 on their pivot pins 14, and also the cover plate 15 on suitable pivots 14'. A front plate 17, supported on feet or pedestals 18, is fixedly mounted on a plurality of inverted channel iron slides 16, adjacent their forward extremities, these channels being slidable upon the rails 10. Extending rearwardly from the end plates 13 are a plurality of formed arms 19 fixedly attached thereupon, to the outer extremity of which are pivotally attached the connecting rods or links 20, the forward extremity of these links being pivotally mounted in adjustable blocks 21 held in brackets 22 integral with the supports 18 of the plate 17. These links may, if desired, be connected as shown by the broken lines at 20'. Blocks 21 may be secured in adjusted position by a set screw 23, or in other desired manner. Mounted pivotally on the end plates 13 and the cover plate 15 are a plurality of latches 24 each having an arcuate cam segment 27 and a beveled cam face 28 to enter and engage registering slots 25 in projections or lugs 26 so that while the cam face 28 forces the plate faces securely together the arcuate cams 27 force the front plate 17 into exact position to make the finished block the exact size desired. Stops 29 are provided on the plates 13 and 15 to limit the motion of these latches, and lugs 30 limit the rearward swing of the cover 15, as at 15'.

Removably secured to the channels 16 are spacer strips 31 to position the pallets 34 in proper elevation, and these strips may be made of an upper and a lower beveled section, 44 and 45, locked in adjusted position as by screws 46 working in the slotted holes 47, to secure this adjustment. Integral with the rails 10 are a plurality of pallet strikes 32 and 33, the strike 32 being preferably slightly forward of strike 33 so that when the pallet and its formed block is carried forward as the mold is opened the pallet strikes the stop 32 first, causing the block to be separated from the front plate by an arcuate action to prevent injury to the relatively soft block during this action. It will also be seen that the end plates will swing entirely free from the block before the front plate with its attached channel irons and the supported pallet and block start to move forwardly by proper adjustment of the lost motion and rod adjustment in the device. To prevent accumulations of cement on the rails 10 they may be beveled where not covered by the channels, as at 36, or the back plate supports 12' may be offset laterally, as at 42', to allow the channels to be elongated, as at 16', if desired. Also the arms 19 which are preferably integral with the ends 13 may be separately formed, as at 19', and be adjustably mounted on the pins 14, as at 35, and 35' when desired. To provide various conformations and styles of block faces and ends, interchangeable false plates 37 may be secured to the inner faces of the mold plates, a plurality of pins 38 having suitable notches 39 to engage the plates 37 through the instrumentality of the nuts 40 being provided, as are also registering openings 41 in adjacent plates.

In operation, the pallet 34 is placed upon the channels 16 and the mold side and end plates closed and locked up by the latches 24, and suitable core forming elements, as claimed in applicant's co-pending application, Serial No. 240,289, are inserted in the openings 43, the mold being then filled with a predetermined quantity of material, and the cover plate lowered and latched down.

The core forming elements are then expanded and subsequently deflated and removed longitudinally from the mold. The cover latches are released and the cover raised, and then the end latches are released and the end plates swung open. As soon as the end plates are free from the block ends the arms 19 and rods 20 cause the front plate, with the formed block and its pallet supported upon the channels, to move forward integrally until the pallet strikes the stop 32 adjacent one end when further forward movement causes an arcuate separation of the block from the front plate until the pallet contacts with the second stop 33, which holds the block stationary, leaving the block and its pallet free for easy and expeditious removal.

It is also evident that the device adapts itself to blocks of any desired form and size including water tables, corner and cornice moldings, window and door frames, and is expediously changed in this respect as it is merely necessary to replace the end and top plates, the front plate and slides providing for a wide variation in widths without alteration or adjustment.

What I claim as new is:—

1. A molding device for plastic material consisting essentially of a base having a plurality of longitudinal rails, a back plate fixedly mounted upon said base, a top plate and a plurality of end plates hingedly mounted upon said back plate, a front plate fixedly mounted on a plurality of sliding members engaging said rails, a pallet resting upon said sliding members, and means for producing motion of said front plate and said pallet upon said rails and for preventing said pallet from continuous movement with said front plate simultaneously with the opening of said molding device.

2. A molding machine for plastic materials comprising a base having a plurality of longitudinal rails adjacent one end of which is mounted a back plate for a mold box, a cover plate and a plurality of end plates for said mold box being pivotally secured upon said back plate, a plurality of slides to engage said longitudinal rails, a front plate for said mold box mounted upon said slides, a pallet removably supported on said slides, and means connected with said end plates to produce longitudinal movement of said slides upon said rails when said mold box is being opened, said pallet moving with said slides and subsequently being restrained from moving with said slides during the opening of said mold box.

3. A plastic block molding machine having a base, a plurality of aligned guides on said base, a plurality of slides coacting with said guides, a mold box side mounted on said slides, a pallet movably supported on said slides adjacent said side, a mold box side in essential alignment with said first mentioned side mounted on said base, a plurality of end plates and a cover plate hingedly secured upon said last mentioned plate to form a mold box when in closed position, means for latching said plates in closed position, and means associated with said end plates to produce a parallel lateral motion of said first mentioned plate and said pallet as said end plates are moved arcuately outward from said closed position of said mold box, and means for subsequently separating said pallet from said moveable side plate during the arcuate movement of said end plates.

4. In a molding machine for cement blocks, a base carrying a plurality of parallel longitudinal guide members, a mold plate mounted fixedly adjacent one edge of said base, end plates and a top plate hingedly supported upon said plate, rearwardly projecting arms integral with said end plates, rods pivotally secured to said arms and extending forward over said base, to connect said arms to a plurality of lugs integral with the supporting feet of a front mold plate mounted on a plurality of slides registering with said guides on said base, said slides supporting interchangeable pallets on which said blocks may be formed, said slides being actuated longitudinally when said end plates are moved arcuately, said pallets moving with said slides.

5. In a molding machine, a base having parallel guides supported thereon, a back mold plate mounted on said base adjacent one side thereof, end and top mold plates pivotally secured to said back plate, rearwardly projecting arms actuated by said end plates, a plurality of rods connecting said arms to a plurality of brackets secured to the under supports of a front plate, a plurality of inverted channel members supporting said front plate and registering upon said parallel guides, means for adjusting said rods in said brackets, said channels extending toward said back plate and support-interchangeable pallets for cement blocks thereon, said pallets moving with said channels and with said front plate when said rods are actuated by said arms on said end plates, a plurality of stops secured upon said base to check the movement of said pallets at a determined point, said channels and said front plate being further moveable after said pallet has been checked.

6. A block and tile molding machine comprising a base with rail guides thereon, slides longitudinally moveable upon said guides, a mold box member mounted upon said slides adjacent one end thereof, a second box member in essential parallelism with said first member mounted upon said base transversely to said guides, end members and a top member supported upon said second box member, arms connected to said end members and projecting rearwardly therefrom, rods positioned between said slides and connecting said arms with said first mentioned box member, to produce longitudinal movement of said slides when said end members are moved arcuately, means for adjusting the length of said rods, a plurality of interchangeable forms mountable upon said ends and on said box members, means for securing said forms in fixed position on said ends and said box members, a pallet supported upon said slides adjacent said first mentioned box member, means for adjusting said pallet vertically, a plurality of stops upon said base adjacent said rail guides to contact with said pallet to check the movement thereof as said slides are moved longitudinally, one of said stops engaging said pallet in advance of the other of said stops to produce a slight arcuate motion of said pallet as it is restrained from its action of following said box member, and said slides, essentially as and for the purpose described.

In testimony whereof, I hereunto set my hand.

JOHN W. HENRY.